US010386041B2

(12) United States Patent
Pugliese et al.

(10) Patent No.: US 10,386,041 B2
(45) Date of Patent: Aug. 20, 2019

(54) SIMPLIFIED CONTROL PANEL FOR A BEVERAGE MACHINE

(71) Applicant: NESTEC S.A., Vevey (CH)

(72) Inventors: Alexandre Pugliese, Paudex (CH); Michael Ayoub, Crissier (CH); Akos Spiegel, Chables (CH)

(73) Assignee: Societe des Produits Nestle S.A., Vevey (CH)

( * ) Notice: Subject to any disclaimer, the term of this patent is extended or adjusted under 35 U.S.C. 154(b) by 294 days.

(21) Appl. No.: 15/517,608

(22) PCT Filed: Sep. 29, 2015

(86) PCT No.: PCT/EP2015/072378
§ 371 (c)(1),
(2) Date: Apr. 7, 2017

(87) PCT Pub. No.: WO2016/055303
PCT Pub. Date: Apr. 14, 2016

(65) Prior Publication Data
US 2017/0307175 A1    Oct. 26, 2017

(30) Foreign Application Priority Data
Oct. 8, 2014  (EP) ..................... 14188131

(51) Int. Cl.
*F21V 9/14*       (2006.01)
*A47J 31/44*      (2006.01)
*G02B 27/28*      (2006.01)

(52) U.S. Cl.
CPC ................ *F21V 9/14* (2013.01); *A47J 31/44* (2013.01); *G02B 27/281* (2013.01)

(58) Field of Classification Search
CPC ... F21V 9/14; A47J 31/44–605; G02B 27/281
(Continued)

(56) References Cited

U.S. PATENT DOCUMENTS 4,285,577 A    8/1981    Schuler

FOREIGN PATENT DOCUMENTS

| CN | 102946775 A | 2/2013 |
| CN | 103562975 A | 2/2014 |
| WO | 2014121520 | 8/2014 |

OTHER PUBLICATIONS

China Patent Office Communication for corresponding Application No. 201580054507.8, dated Feb. 3, 2019, 13 pages.

*Primary Examiner* — Wen Huang
(74) *Attorney, Agent, or Firm* — K&L Gates LLP (57) ABSTRACT

A selection device (2) for a beverage preparation machine (1), comprises a fixed selection element (3) and a mobile selection element (4), the fixed selection element (3) comprising a set of marks (33) each corresponding to a parameter value, the mobile selection element (4) being movable in relation to the set of marks (33) for selecting a parameter value by positioning the mobile selection element (4) in visual association with a selected mark ($33_x$). The selection device (2) further comprises a light-sending layer which is disposed in the fixed selection device (3), a polarization layer for polarizing said sent light, and at least one polarization modifying layer able to modify the polarization of the polarized light such that the visual aspect of a selected mark ($33_x$) is modified when the mobile selection element (4) is positioned in visual association with the selected mark ($33_x$), the polarization modifying layer being disposed in superposition relative to the polarization layer and relative to the selected mark ($33_x$).

14 Claims, 6 Drawing Sheets

(58) Field of Classification Search
USPC .................................................. 359/490.01
See application file for complete search history.

SIMPLIFIED CONTROL PANEL FOR A BEVERAGE MACHINE

CROSS REFERENCE TO RELATED APPLICATIONS

The present application is a National Stage of International Application No. PCT/EP2015/072378, filed on Sep. 29, 2015, which claims priority to European Patent Application No. 14188131.8, filed on Oct. 8, 2014, the entire contents of which are being incorporated herein by reference.

FIELD OF THE INVENTION

The present invention concerns a selection device for a beverage preparation machine.

BACKGROUND OF THE INVENTION

Beverage preparation machines are well known in the food science and consumer goods area. Such machines allow a consumer to prepare at home a given type of beverage, for instance a coffee-based beverage, such as espresso or filter coffee.

Today, many beverage preparation machines for in-home use comprise a system which can accommodate portioned beverage ingredients. Such portions may be contained typically in pods, sachets or capsules.

The machine comprises a receptacle or cavity for accommodating said portioned beverage ingredients and a fluid injection system for injecting a fluid, such as water, under pressure into the pod or capsule. Thus the fluid, for example hot or cold water, passes through the capsule or pod and delivers a liquid food or beverage.

Some machines comprise a selection system, allowing a user of the machine to select a value for at least one parameter from among a set of predetermined values when preparing a beverage. For example, a parameter may be a fluid volume, a fluid temperature, a pressure or infusion time. In one example, a machine delivers a quantity of liquid food or beverage based on the fluid volume value that has been selected by the user. This type of machine is known as "Flow Stop" or "Semi Flow Stop" machine, or "automatic" or "semi-automatic" machine.

In some machines, the selection system is a part of a Human Machine Interface (HMI) that is quite sophisticated, such as a touchscreen (or "tactile control panel"). These machines may be expensive.

In other simpler and less expensive machines, the selection device comprises a panel comprising a set of marks, each mark representing a predetermined parameter value, for example a fluid volume parameter value; and a mobile selection element which is movable in relation to the set of marks for selecting a parameter value by positioning it in visual association with a mark. Such simpler selectors have been described in the prior art, for instance in the Applicant's International Patent application WO 2014 121520 A1.

Thus, a user of the machine positions the mobile selection element in visual association with a mark (for example over a mark or close to a mark) in order to select the parameter value associated with this mark.

The selection made by the user may sometimes be difficult to see.

It is therefore an object of the present invention to provide a selection device which resolves at least some of the above difficulties making it possible to improve the viewing of a selection of a parameter without significantly raising the price of the selection device.

SUMMARY OF THE INVENTION

In a first aspect of the invention, there is provided a selection device for a beverage preparation machine, comprising a fixed selection element and a mobile selection element, the fixed selection element comprising a set of marks each corresponding to a parameter value, the mobile selection element being movable in relation to the set of marks for selecting a parameter value by positioning the mobile selection element in visual association with a selected mark, the selection device comprising a light-sending layer which is disposed in the fixed selection device, a polarization layer for polarizing said sent light, and at least one polarization modifying layer able to modify the polarization of the polarised light such that the visual aspect of a selected mark is modified when the mobile selection element is positioned in visual association with the selected mark, the polarization modifying layer being disposed in superposition relative to the polarization layer and relative to the selected mark.

By virtue of the superposition of the polarization layer, the polarization modifying layer and the selected mark, the visual aspect of the selected mark is modified. Thus, the selected mark can clearly be distinguished from the other marks, the viewing of a selected mark corresponding to a parameter value selected by a consumer being improved.

Therefore, the selection device is user-friendly without significantly raising its price.

According to one embodiment, the polarization modifying layer able to modify the polarization of the polarised light comprises at least a wave-plate for shifting the phase between two perpendicular components of the polarised light, the visual aspect of the selected mark being modified or not as a function of the value of said phase shift.

Thus, a first component of the polarised light is delayed with respect to a second component. It should be noted that the delay value is proportional to the wavelength of the polarised light.

According to an embodiment, the fixed selection element comprises a layer in which said set of marks is formed by making openings.

According to particular embodiment, the layer in which the set of marks is formed is an opaque cap, each mark being represented by at least one opening.

Therefore, polarized light may go out from the selecting device through the openings representing the marks. The rest of the surface of the opaque cap prevents the polarized light from entering the selecting device.

Thus, depending on the polarization of the light, i.e. on the delay value between the two components of polarised light, the light goes out or does not go out from the selection device through the openings.

For example, if the light does not go out from the opening when the mobile selecting device is not positioned in visual association with the mark, the polarized light goes out from the opening representing the selecting mark when the mobile selecting element is positioned in visual association with a mark.

It should be noted that when the polarised light goes out from the selection device, for example through an opening, the opening appears illuminated, and when no polarised light go out from the selection device, the selection device is not illuminated or appears obscured.

According to yet another embodiment, the layer in which the set of marks is formed is said light-sending layer, the openings being filled and the rest of the layer being unfilled.

Therefore, light which is sent by the parts of the light-sending layer corresponding to openings goes out or does not go out from the selection device depending on the polarization of the light.

According to one embodiment, the fixed selection element comprises a rear part and a front part and the mobile selection element configured to slide between the rear part and the front part.

According to a particular embodiment, the light-sending layer is disposed in the rear part of the fixed selection element, said at least one polarization modifying layer is disposed in the fixed selection element and said polarization layer is disposed in the mobile selection element.

Depending on the position of the mobile selection element, the light originating from the outside of the selection device is polarized. Thus, when the mobile selection element is positioned in superposition relative to a selected mark, polarized light enters the selecting device, travels through the wave-plate and the visual aspect is modified.

According to another particular embodiment, the light-sending layer is disposed at the rear part of the fixed selection element, the polarization layer is disposed in the front part of the fixed selection element and the at least one polarization modifying layer is disposed in the mobile selection element.

Depending on the position of the mobile selection element, the polarised light travels or does not travel through a wave-plate and consequently the polarization of the polarised light is modified or not modified respectively.

According to an embodiment, the selection device comprises a second polarization modifying layer disposed in the fixed selection element and between said light-sending layer and said polarization layer.

Depending on the number of polarization modifying layers that polarized light passes through, the visual aspect of the selection device, and in particular of a mark, is modified According to another embodiment, the layer in which the set of marks is formed is the at least one polarization modifying layer, the polarization modifying layer being disposed in superposition relative to the polarization layer and relative to the light-sending layer.

In one particular embodiment, each mark is represented by at least one opening made in the at least one polarization modifying layer.

Thus, the polarised light goes out from the selection device through the openings and consequently it does not pass through the wave-plate. On the contrary, the polarised light traverses the wave-plate in the rest of the layer. As a consequence, the phase shift introduced between components of the polarised light is different for the part of the layer corresponding to the marks (openings) as compared to the part of the layer not corresponding to the marks.

Depending on the position of the mobile selection element, the polarised light may go out from the selection device.

For example, the fixed selection element comprises a second polarization modifying layer, said light-sending layer being disposed in the rear part of the fixed selection element, said polarised layer being disposed in the front part of the fixed selection element, and the second polarization modifying layer being disposed in the mobile selection element.

It should be noted that when an additional wave-plate is disposed in the selection device, the polarization of polarised light is modified, and the visual aspect of the marks may be inversed. For example, in a case where only one wave-plate is present in the selection device and the visual aspect of a selected mark (i.e. when the mobile selection element is positioned in visual association with the mark) is as an illuminated mark, if a second wave-plate is added, the visual aspect of the selected mark changes, the mark appearing obscured or not illuminated.

According to an embodiment, the light-sending layer comprises a reflective surface sending reflected light originating outside the selection device and the at least one polarization modifying layer comprises one a quarter-wave plate.

Thus, natural light arriving at the selection device is polarised and next, reflected by the reflective surface, the polarised natural light going out from the selection device depending on the polarization of the light and on the position of the mobile selection element.

According to another embodiment, the light-sending layer comprises an illuminating surface, the selection devices further comprising a second polarization layer disposed in contact with said light sending layer, and the at least one polarization modifying layer comprises one half-wave plate.

In this embodiment, light emitted by the light-sending layer is polarised and next, it goes out from the selection device depending on the polarization of the light and on the position of the mobile selection element.

The viewing of a selected mark is highly improved with this embodiment. In particular, the viewing of a selected mark is independent of the luminosity around the selection device.

For example, the light sending layer is illuminated by light originating from a light-sending diode or from an optical fiber.

According to a second aspect of the invention, there is provided a beverage preparation machine comprising a selection device according to the invention.

The advantages of the beverage preparation machine are similar to those of the selection device.

As used in this specification, the words "comprises", "comprising", and similar words, are not to be interpreted in an exclusive or exhaustive sense. In other words, they are intended to mean "including, but not limited to.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The invention is further described with reference to the following examples. It will be appreciated that the invention as claimed is not intended to be limited in any way by these examples.

Figure 1:
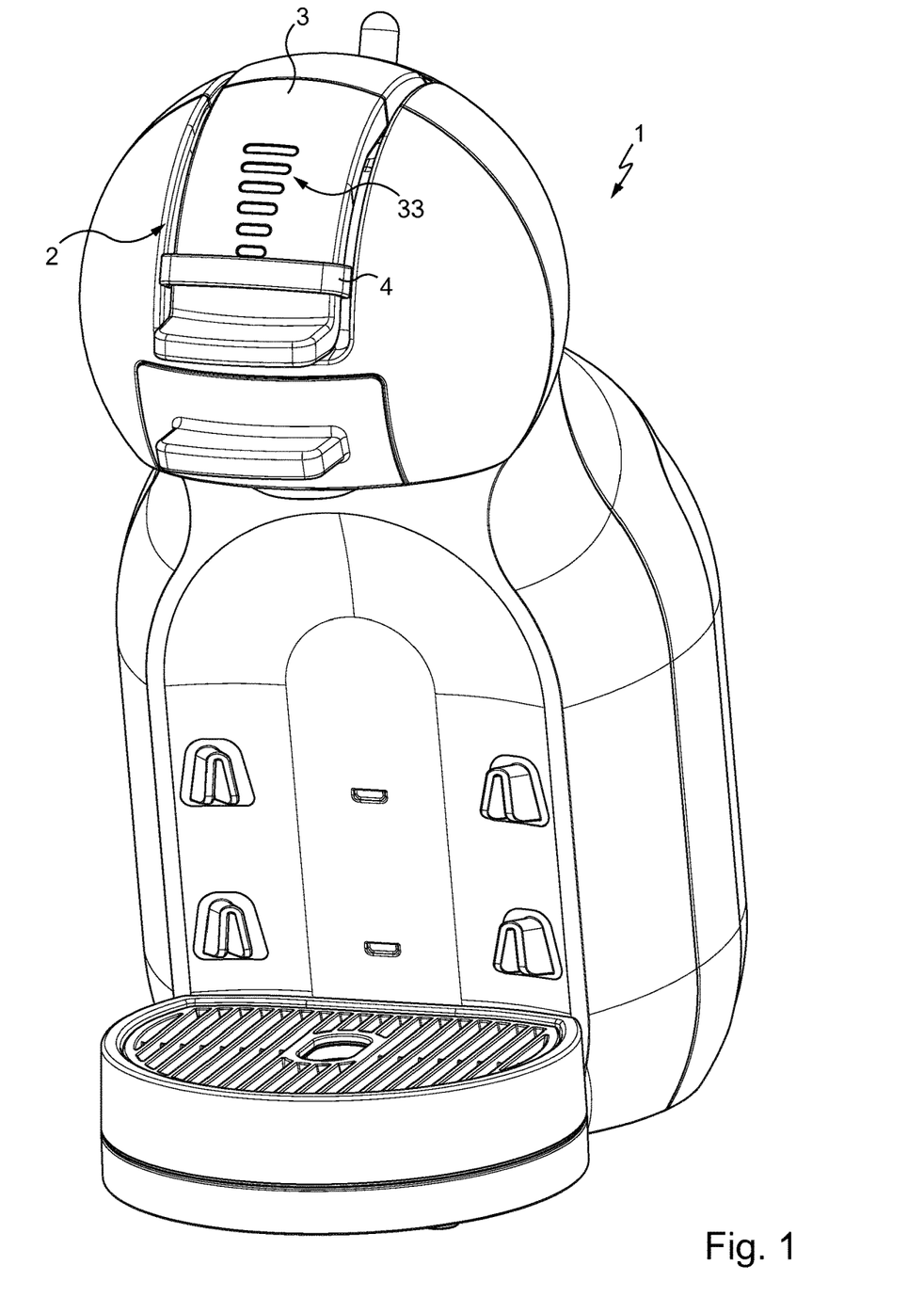
FIG. 1 is illustrates a beverage preparation machine comprising a selection according to the invention.

FIG. 1 illustrates a beverage preparation machine 1 according to one embodiment. The beverage preparation machine 1 comprises a selection device 2 allowing a user of the machine to select a value for a parameter used in the preparation of the beverage.

By way of a non-limiting example, the user may select the fluid volume for the beverage.

Naturally, the parameter value which may be selected by a user by means of the selecting device may be different, for example a fluid temperature, a pressure or infusion time.

Figure 2:
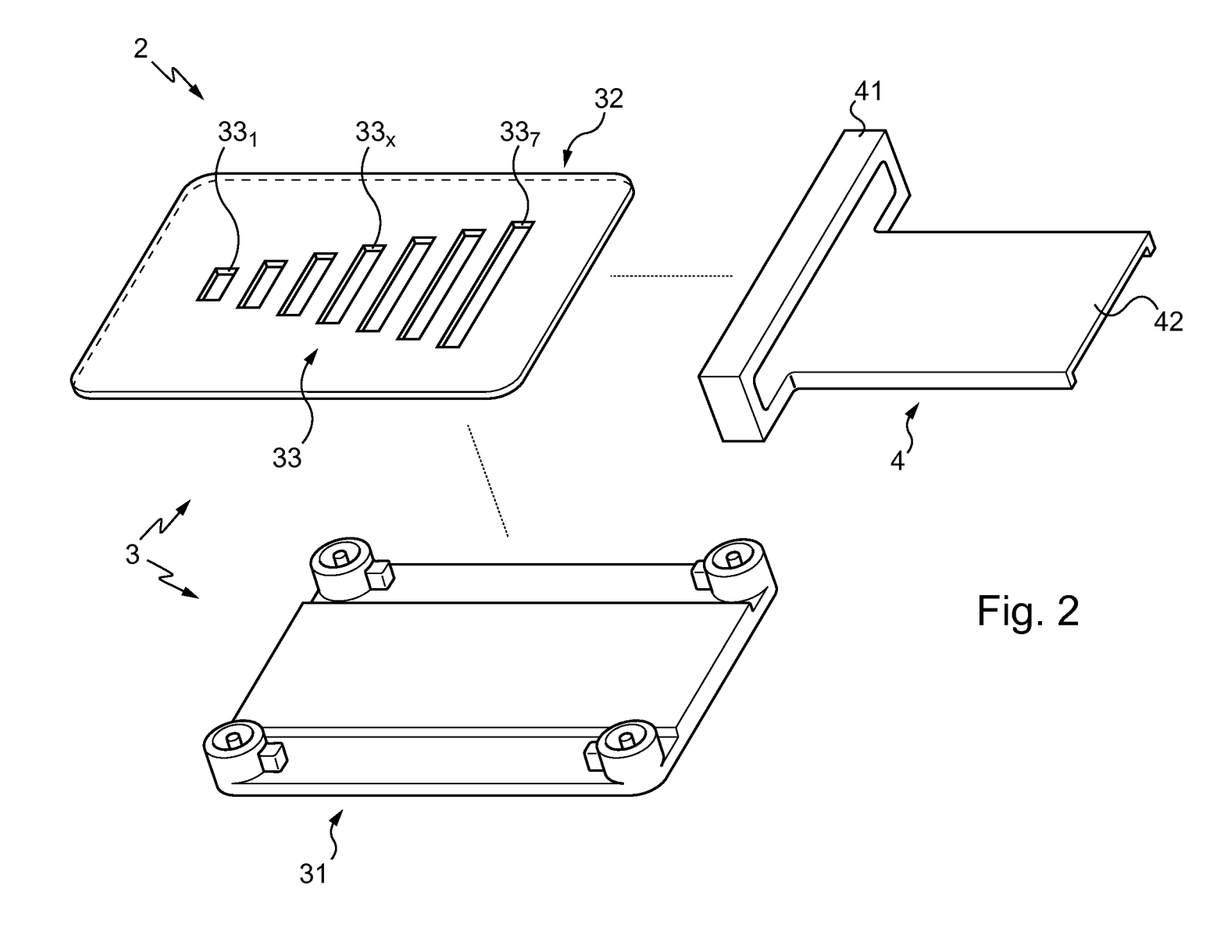
FIG. 2 represents an exploded view of a selection device according to an embodiment of the invention.

As it will be further described in reference to FIG. 2, the selection device 2 comprises a fixed selection device 3 and a mobile selection device 4.

The fixed selection device 3 comprises a set of marks 33 each corresponding to a parameter value. The mobile selection device 4 is movable in relation to the set of marks 33 for selecting a parameter value by positioning the mobile selection element 4 in visual association with a selected mark (no mark is selected in FIG. 1).

In the embodiment represented in FIG. 1, the mobile selection device 4 comprises an elongated piece. According to an example, in order to select a volume value, the user positions the elongated piece 4 in superposition relative to a mark corresponding to the wished volume value.

It should be noted that FIG. 1 represents an example of beverage preparation machine 1 and of a selection device 2.

Naturally, the beverage preparation machine 1, and in particular the selection device 2 may presents different forms.

FIG. 2 shows an exploded view of the selection device according to an embodiment.

As indicated above, the selection device 2 comprises a fixed selection element 3 and a mobile selection element 4. The fixed selection element 3 comprises a rear part 31 and a front part 32 and the mobile selection element 4 is configured to slide between the rear part 31 and the front part 32.

The fixed selection element 2 comprises a set of marks 33 each corresponding to a parameter value. The set of marks is disposed in the front part 32 of the fixed selection element 2 such that it can be viewed by a user of the beverage machine.

The set of marks 33 comprises a plurality of marks which are referred in the Figures as $33_X$, X being the number of marks. According to a non-limitative example, the marks $33_X$ are aligned (vertically in FIG. 1) and each mark $33_X$ presents a rectangular shape each rectangular shape being of a different length, the length gradually increasing from a first mark $33_1$ to a last mark $33_7$ (X being equal to 7 in this embodiment). In the embodiment described hereafter in reference to the drawing, the series of marks on the surface of the control panel of the machine, are arranged and dimensioned so that the whole set of marks represents schematically the shape of a cup.

Naturally, the number, the shape and the arrangement of the marks may be different. For example, the marks may be of circular, square, oblong or other shape, and the marks may be aligned vertically or horizontally or form together a figure such as for example a circle. Also, the marks $33_X$ may be of similar or different size.

The mobile selection element 4 is movable in relation to the set of marks 33 for selecting a parameter value by positioning the mobile selection element 4 in visual association with a selected mark.

The mobile selection element 4 is in visual association with a selected mark $33_X$, for example when the mobile selection element 33 is situated in superposition relative to the selected mark or close to the selected mark.

According to one embodiment which is represented in FIG. 2, the mobile selection element 4 comprises an extremity part 41 and a panel 42. The extremity part 41 comprises an elongated piece.

In this example, a mark $33_X$ is considered as selected when the elongated piece is positioned in superposition relative to the mark $33_X$. Thus, when the elongated piece is superposed relative to the selected mark $33_X$, the mobile selection element 4 is in visual association with the selected mark $33_X$.

As a variant, an extremity part 41 may be situated close to the selection mark without being disposed in superposition. This extremity part 41 may be a piece, presenting any form, which is positioned close to a selected mark $33_X$.

Naturally, the form of the panel 42 may be different from the represented form.

For example, the form of the panel may be planar or curved, depending on the form of the fixed selection element 3.

According to another embodiment, the mobile selection element 4 comprises only a panel 42 which slides between the rear part 31 and the front part 32 of the fixed selection device 3. A mark $33_X$ is considered as selected when the panel 42 is positioned in superposition relative to the mark $33_X$, the end of the panel being close to the mark $33_X$ (as for example in FIGS. 3, 4 and 5).

Figure 6A:
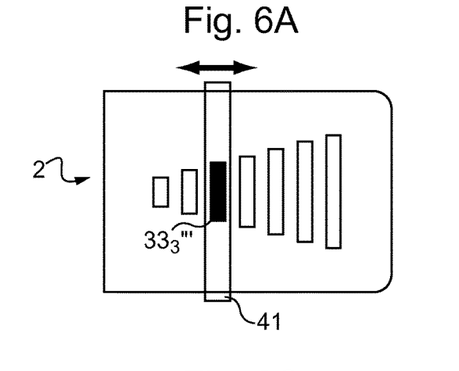
FIGS. 6A, 6B, 6C and 6D represents a plurality of top views of the selection device according to different embodiments.
Figure 6B:
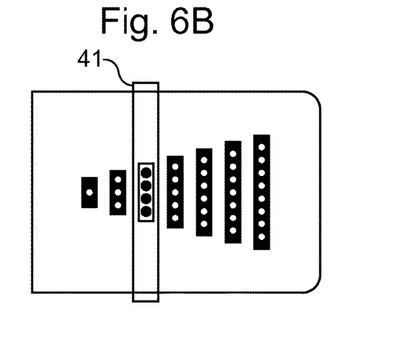
Figure 6C:
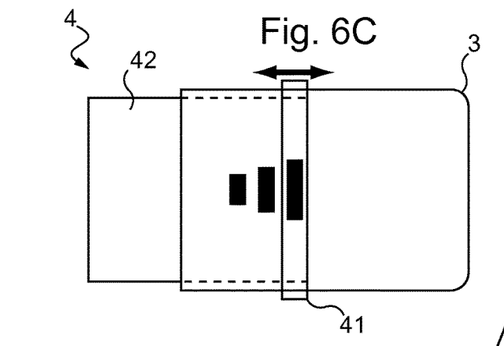
Figure 6D:
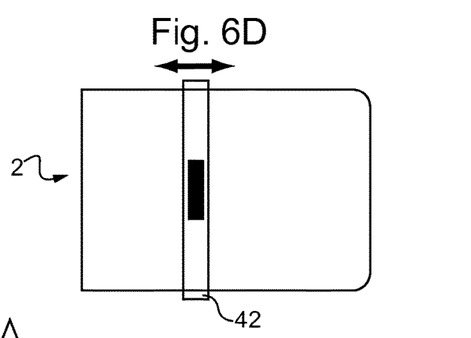

According to another embodiment, the mobile selection element 4 comprises only an extremity part 41 (as for example in FIGS. 6A, 6B and 6D). The extremity part 41 comprises for example an elongated piece designed to be positioned in superposition relative to a selected mark $33_X$.

Figure 3A:
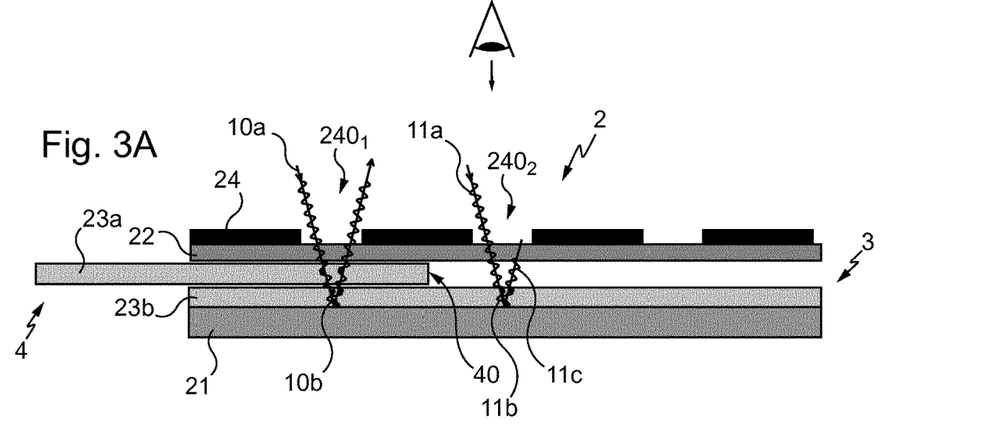
FIGS. 3A and 3B represent respectively a section view and a top view of the selection device according to a first embodiment.
Figure 3B:
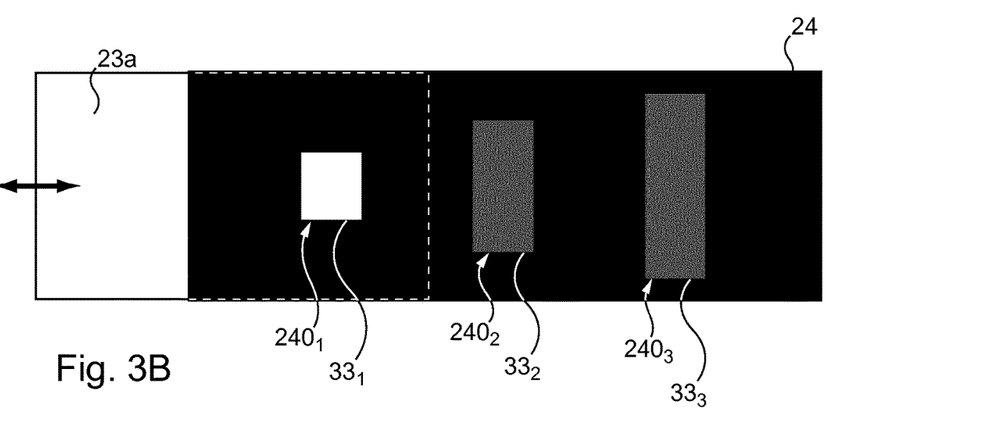

A section view of a part of the selection device 2 according to an embodiment is shown by FIG. 3A. FIG. 3B represents schematically a corresponding top view.

The selection device 2 comprises a light-sending layer 21 for sending light, a polarization layer 22 for polarising the light passing through it, for example the light sent by the light-sending layer 21, and a first polarization modifying layer 23a able to modify the polarization of the polarised light such that the visual aspect of a selected mark is modified when the mobile selection element 4 is positioned in visual association with the selected mark $33_X$.

In the embodiment represented by FIGS. 3A and 3B, the light-sending layer 21 is disposed in the rear part 31 of the fixed selection element 3, the polarization layer 22 is disposed in the front part 32 of the fixed selection element 3, and the first polarization modifying layer 23a is disposed in the mobile selection element 4.

The fixed selection element 3 comprises a layer in which said set of marks 33 is formed by making openings.

According to the embodiment represented by FIGS. 3A and 3B, the layer 24 in which the set of marks 33 is formed is an opaque cap 24, each mark $33_X$ being represented by at least one opening $240_X$.

Thus, as shown in FIGS. 3A and 3B, a first mark $33_1$ is formed by a first opening $240_1$ implemented in the opaque cap 24, a second mark $33_2$ is formed by a second opening $240_2$ and a third mark $33_3$ is formed by a third opening implemented in the opaque cap 24.

In the described example, the fixed selection element 3 comprises a second modifying layer 23b disposed between said light-sending layer 21 and said polarization layer 22.

According to one embodiment, the first and second polarization modifying layers 23a, 23b able to modify the polarization of the polarised light comprises one wave-plate for shifting the phase between two perpendicular components of the polarised light, the visual aspect of the selected mark being modified or not as a function of the value of said phase shift.

It should be noted that depending on the type of wave-plate the value of phase shift is different. For example, if the wave-plate used is a quarter-wave plate, a first component of polarised light is delayed with respect to a second component by 90°. According to another example, if the wave-plate used is a half-wave wave plate, a first component of polarised light is delayed with respect to a second component by 180°.

In this example embodiment, the optical axis of the wave-plate and the optical axis of the polarization layer are off-set (or shifted) one relative to the other by an angle of 45°.

In this example a first mark $33_1$ is selected by a user of the beverage machine. Thus, the mobile selection element 4 slides such that it is situated in superposition relative to the first opening $240_1$, an inner end 40 of the mobile selection element 4 being situated between the first $240_1$ and a second $240_2$ opening.

As represented by FIGS. 3A and 3B, the first polarization modifying layer 23a and de second polarization modifying layer 23b are disposed in superposition relative to the polarization layer 22 and relative to the selected mark $33_1$.

In the described example, the light-sending layer 21 comprises a reflective surface sending reflected light originating from the outside of the selection device. Therefore, in this example, a light wave 10a originating from the outside of the selection device and that goes into the selecting device 2 through the first opening $240_1$, passes successively through the polarization layer 22, the first wave-plate 23a, and the second wave-plate 23b and finally arrives at the light-sending layer 21 (here the reflective surface).

Thus, a delayed polarised light wave 10b is reflected by the reflective surface 21 and passes successively through the second wave-plate 23b, the first wave-plate 23a and the polarization layer 22, and finally goes out from the selection device 2 by the first opening $240_1$.

As a consequence, the first opening $240_1$, i.e. the first mark $33_1$, appears illuminated, and thus, in contrast with the rest of the opaque cap 24, the opaque cap 24 preventing the light from entering the selecting device 2.

Concerning the second opening, a light wave 11a that goes into the selecting device 2 through the second opening $240_2$, passes successively through the polarization layer 22, and the first wave-plate 23a and finally arrives at the light-sending layer 21 (here the reflective surface).

Thus, a delayed polarised light wave 11b is reflected by the reflective surface 21 and passes successively through the second wave-plate 23b and the polarization layer 22. In this case, a delayed light wave 11c cannot go out through the second opening $240_2$, and the second opening $240_2$, i.e. the second mark $33_2$ appears obscured or not illuminated.

It should be noted that by virtue of the polarization of the light entering and leaving the selection device 2, the difference between the visual appearance of an illuminated zone and of a non-illuminated zone is accentuated.

Naturally, the position of the first polarization layer 23a and the second polarization layer 23b may be different in the selection device.

For example, the second polarization modifying layer 23b may be positioned at the front part of the fixed selection element, in contact with the polarization layer 22, the mobile selection element 4 sliding between the second polarization modifying layer 23b and the light-sending layer 21.

In other embodiments, the opaque cap 24 may be positioned at different positions between the light-sending layer 21 and the polarization layer 22.

Figure 4A:
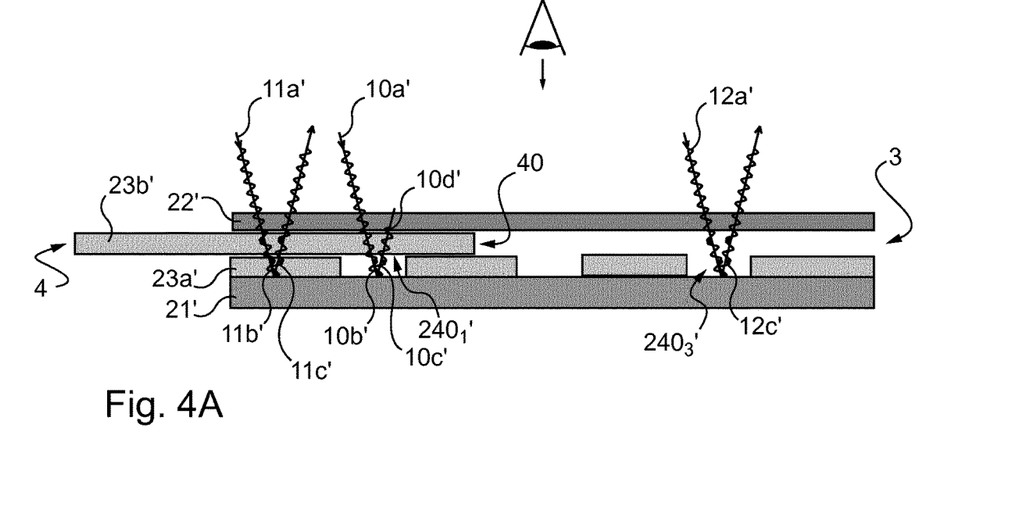
FIGS. 4A and 4B represent respectively a section view and a top view of the selection device according to a second embodiment.
Figure 4B:
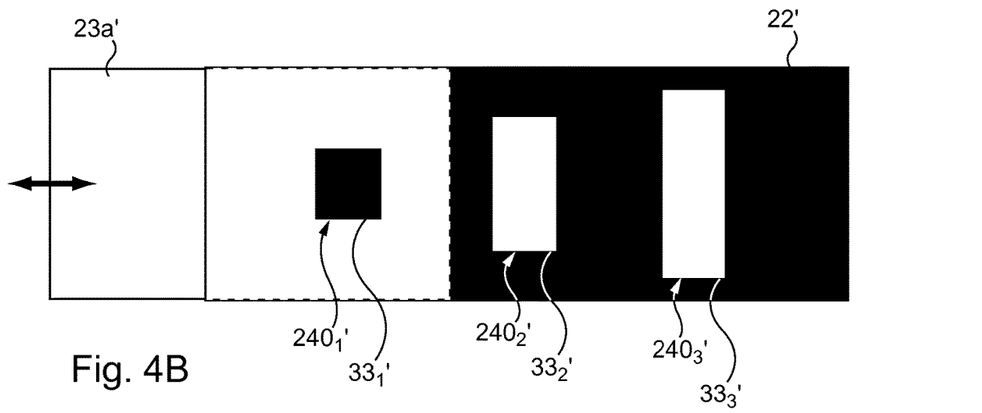

FIGS. 4A and 4B represent schematically a section view and a top view of a selection device 2 according to another embodiment.

According to this embodiment, a light-sending layer 21' is disposed in the rear part 31 of the fixed selection element 3, a polarization layer 22' is disposed in the front part 32 of the fixed selection element 3, and a first polarization modifying layer 23a' is disposed here in the rear part 31 of the fixed selection element 3.

The selection device 2 comprises a second polarization modifying layer 23b' disposed in the mobile selection device 4.

In this embodiment, the light-sending device 21' comprises a reflective surface and the polarization modifying layers 23a', 23b' comprises each one wave-plate.

According to an example, each of the wave-plates is a quarter-wave plate.

According to the described embodiment, the layer in which the set of marks 33 is formed is the first polarization modifying layer 23a'.

The first polarization modifying layer 23a' comprises a wave-plate in which the set of marks 33 is formed by making openings $240_1'$, $240_2'$, $240_3'$. Thus, each opening $240_1'$, $240_2'$, $240_3'$ represents a mark $33_1'$, $33_2'$, $33_3'$ each corresponding to a parameter value.

In this example a first mark $33_1'$ is selected by a user of the beverage machine 1. Thus, the mobile selection element 4 is configured to slide such that it is situated in superposition relative to the first opening $240_1'$ and the inner end 40 of the mobile selection element 4 is situated between the first $240_1'$ and a second $240_2'$ opening.

In this example, at the first mark $33_1'$, a light wave 10a' originating from the outside of the selection device, passes successively through the polarization layer 22', and the second polarization modifying layer 23b' or second wave-plate, goes through the first opening $240_1'$, and finally arrives at the light-sending layer 21' (here a reflective surface).

Thus, in this example, the light wave 10a' passes through only one wave-plate 23b', the polarised light wave being delayed by 90°.

The delayed polarised light wave 10b' is reflected by the reflective surface 21' and passes through the second wave-plate 23b. The reflected light wave 10c' is thus delayed by 90°, the light wave 10a' being delayed in total by 180°.

Therefore, the 180° delayed light wave 10d' cannot go out from the selecting device 2, and the first mark $33_1'$ appears obscured or not illuminated.

A light wave 11'a in the selection device around the mark $33_1'$ passes successively through the polarization layer 22', the second wave-plate 23b' and the first wave-plate 23a', and finally arrives at the light-sending layer 21'.

Thus, the light wave 11a' is delayed by 180° and the delayed polarised light wave 11b' is reflected.

This reflected light wave 11c' passes successively through the first wave-plate 23a', the second wave-plate 23b', and the polarization layer 22' and finally goes out from the selection device 2'. Thus, the zone of the selection device 2 around the first mark $33_1$' is illuminated.

It should be noted that the light wave 11a' is delayed in total by 360°.

Therefore, the contrast between the first mark $33_1$' and the zone of the selection device around the first mark $33_1$' is incremented, rendering clearer the view of the selected mark.

A light wave 12a' passing through the polarization layer 22' at the level of a non-selected mark, for example the third mark $33_3$', is reflected by the light-sending layer 21'. The reflected light wave 12c' passes through the polarization layer 22' and goes out from the selection device 2. Thus the third opening $33_3$' (and the second one $33_2$') is illuminated.

It should be noted a polarised light wave at a non-selected mark does not passes through any wave-plate, the light wave not being delayed.

In the selection device 2 where the first wave-plate 23a' is not disposed in superposition relative to the first wave-plate 23a' (corresponding to the selection device 2 around a non-selected mark such as $33_2$' and $33_3$' in FIGS. 4A and 4B), light passes through the first wave-plate 23a' twice and it appears obscured or not illuminated.

Naturally, as described in reference to FIGS. 3A and 3B, the position of the first and second polarization modifying layers may be different.

Figure 5A:
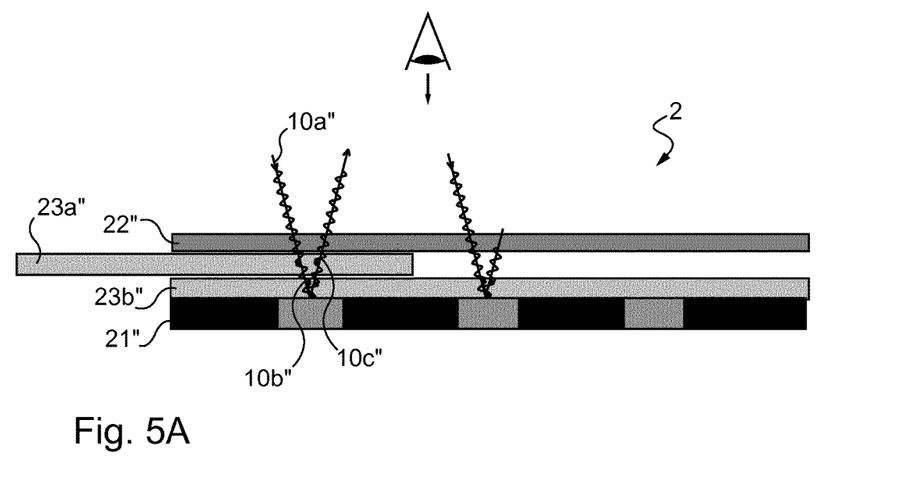
FIGS. 5A and 5B represent respectively a section view and a top view of the selection device according to a third embodiment.
Figure 5B:
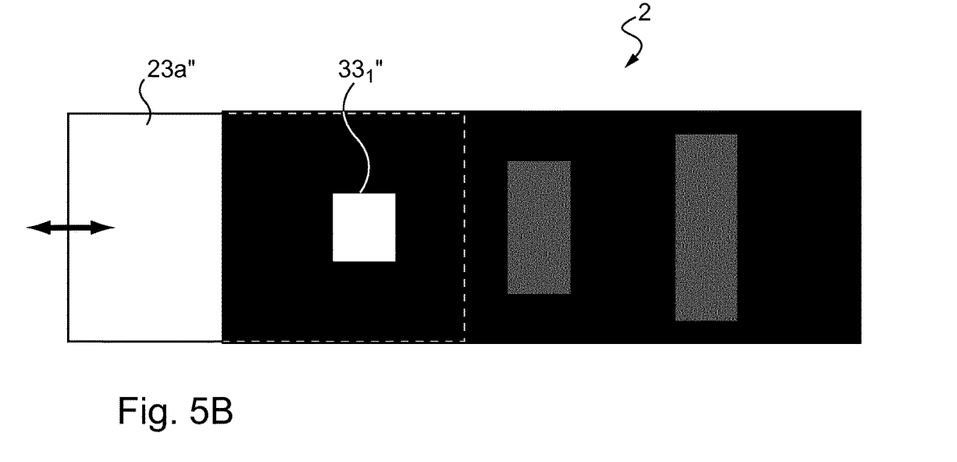

FIGS. 5A and 5B represent schematically a section view and a top view of a selection device 2" according to another embodiment.

According to this embodiment, a light-sending layer 21" is disposed in the rear part 31 of the fixed selection element 3, a polarization layer 22" is disposed in the front part 32 of the fixed selection element 3, and a first polarization modifying layer 23a" is disposed in the mobile selection element 4.

The fixed selection element 3 comprises a second polarization modifying layer 23b" disposed in superposition relative to the light-sending layer 21" and relative to the polarization layer 22".

In this embodiment, the polarization modifying layers 23a", 23b" comprises each one wave plate.

According to an example, each of the wave-plates is a quarter-wave plate.

According to this embodiment, the layer in which the set of marks 33" is formed is the light-sending layer 21" the openings being filled and the rest of the layer being unfilled.

In this embodiment the light-sending layer 21" comprises zones that are filled with a reflective surface (zones corresponding to openings) and zones which are unfilled or not filled with a reflective surface.

A light wave 10a" passing through the polarization layer 22", at the level of a selected mark $33_1$", passes successively through the first wave-plate 23a" and the second wave-plate 23b", and finally arrives to the light-sending layer 21". The light-sending layer 21" comprising a reflective surface at the level of the mark $33_1$" or opening $240_1$", the delayed light wave 10b" is reflected and passes successively through the second wave-plate 23b", the first wave-plate 23a" and the polarization layer 22', and finally goes out from the selecting device 2".

Thus, selected mark $33_1$" appears illuminated. The rest of the selecting device appears obscured or not illuminated.

It should be noted that in this embodiment, the zones of the selection device 2 corresponding to the marks 33" which are not selected appears less obscured than zones of the selecting device not corresponding to a mark 33". Even if a slight quantity of light is reflected by the reflecting layer, this slight quantity of reflected light is not polarised and the appearance of the mark is obscure.

Naturally, as described in reference to FIGS. 3A and 3B, the position of the first and second polarization modifying layers may be different.

According to embodiments represented by FIGS. 3, 4 and 5, the mobile selection device 4 comprises only a panel 42 that slide between the rear part 31 and the front part 32 of the fixed selection device 3.

The mobile selection device may comprise an extremity part 41 as explained above.

According to the embodiment represented by FIGS. 3, 4 and 5, marks preceding a selected mark $33_X$, $33_X$', $33_X$" appears illuminated if the selected mark appears illuminated and not illuminated if the selected mark appears not illuminated.

Thus, for example if the third mark $33_3$, $33_3$" is the selected mark and it appears illuminated (as in FIGS. 3 and 5), the first mark $33_1$, $33_1$" and the second mark $33_2$, $33_2$" appear also illuminated.

According to other embodiments, the polarization layer 22, 22', 22" and the polarization modifying layers 23a, 23b, 23a', 23b', 23a", 23b" may be situated differently.

For example, according to an embodiment (not represented), the polarization layer is disposed in the mobile selection element 4, in particular in an extremity part 41 which is configured to be positioned in superposition of a selected mark.

Thus, for example, according to this not represented embodiment, the selection device 2 comprises a light-sending layer and a polarization modifying layer situated in the rear part 31 of the fixed selection element 3 and an opaque cap situated in the front part 32 of the fixed selection element 3. The openings corresponding to the marks are formed in the opaque cap. The mobile selection element 4 comprises an elongated piece (as that one represented in FIG. 2 and referenced 41). The polarization layer is situated in the elongated piece.

When the elongated piece is positioned in superposition to a mark, light is polarized and enters the selection device 2 through the opening corresponding to the selected mark.

According to the explanations above, if the selection device 2 comprises only a quarter-wave-plate, the selected mark appears obscured. If two quarter-wave-plates are positioned in superposition, the mark appears illuminated.

It may be noted that depending on the number of quarter-wave-plates that are positioned in superposition, the selected mark appears illuminated or not illuminated.

A top view of a selection device 2 according to this embodiment is represented by FIG. 6A. In this embodiment, the mobile selection element 4 comprises only an extremity part 41 formed by elongated piece.

According to an example, the extremity part 41 is positioned in superposition of a third mark $33_3$''', the selected mark $33_3$''' appearing obscured.

It should be noted that in the described embodiment, the mark $33_3$''' appears obscure if the selection device comprises an odd number of quarter-wave plates. On the contrary, the mark appears illuminated if the selection device comprises an even number of quarter-wave plates.

In general, according to a same structure of selection device, if light passes through an odd number of polarization modifying layers rendering a mark illuminated, when light passes through an even number of polarization modifying layers, a mark appears obscured, and vice-versa.

Naturally, as described above, the shape of the marks may be different.

According to an example represented by FIG. 6B, a mark may be represented by a plurality of symbols. In FIG. 6B each mark is formed by a rectangle and succession of points inside the rectangle. The aspect of the points and the rectangle are inversed and the aspect of both is different for a selected mark and for a non-selected mark.

FIG. 6C represents an embodiment in which the set of marks is invisible when no mark is selected.

This embodiment may be achieved for example by a selection device comprising, as the example represented by FIG. 4A, a light-sending layer (a reflective surface), a first polarization modifying layer disposed in superposition of the light-sending layer and a polarization layer, all being disposed in the fixed selection element 3.

In an example, the set of marks is formed in the polarization modifying layer by making openings.

In this embodiment, the first polarization modifying layer comprises a quarter-wave plate, the optical axis of the wave-plate and the optical axis of the polarization layer forming an angle of 0° or 90°.

The mobile selection element 4 comprises a second modifying layer which comprises a second quarter-wave plate, the optical axis of the second wave-plate forming an angle of 45° with the optical axis of the polarization layer.

In this embodiment, when no mark is selected, the surface of selection device 2 viewed by a user appears illuminated. When the mobile selection element 4 slides into the fixed selection element 3, an obscured or non-illuminated mark appears when the mobile selection element 4 is positioned in superposition relative to the mark (selected mark).

Figure 7A:
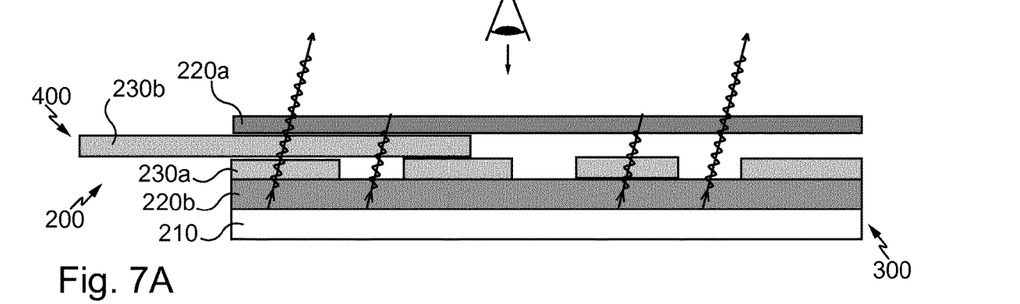
FIGS. 7A and 7B represent respectively a section view and a top view of the selection device according to another embodiment.

Naturally, a similar result may be obtained with other structures, for example with a structure as represented in FIG. 7A in which the light-sending layer comprises an illuminating surface, and the optical axis of polarization modifying layer (reference 230a) forms an angle of 0° or 90° with the optical axis of the first polarization layer (reference 220a).

According to another embodiment, the selection device may comprise a structure of layers similar to that represented in FIG. 3A, in which the axis of the second polarization modifying layer (reference 23b) forms an angle of 0° or 90° with the optical axis of the polarization layer (reference 22). In this embodiment, when no mark is selected, the surface of the selection device viewed by a user appears obscured or non-illuminated.

When the mobile selection element slides into the fixed selection element, a mark appears illuminated when the mobile selection element is positioned in superposition relative to the mark (a selected mark).

Naturally, in other embodiments, the light-sending layer may comprise an illuminating layer.

As represented by FIG. 6D, if the mobile selection element 4 comprises only an extremity part 41 formed by an elongated piece configured to be positioned only in superposition relative to the selected mark (such as the mobile selection device represented by FIGS. 6A and 7B), only the selected mark appears obscured.

According to other embodiments, the polarization modifying layers 23a, 23b (or at least one of them) may be situated in the front part 32 of the fixed selection element 3 such as the light originating from the outside of the machine is polarized.

In such an embodiment, a polarization layer is also situated in the front part 32 of the fixed selection element 3.

Figure 7B:
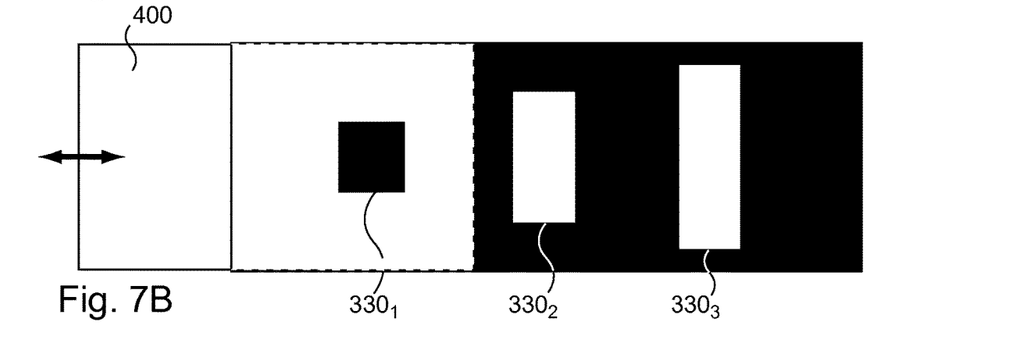

FIGS. 7A and 7B represent schematically a section view and a top view of a selection device 200 according to another embodiment.

In this embodiment, the selection device 200 comprises a first polarization layer 220a, a second polarization layer 220b, a first polarization modifying layer 230a, a second polarization modifying layer 230b and a light-sending layer 210.

In this embodiment, the fixed selection element 300 comprises the light-sending layer 210 comprising an illuminating surface.

It should be noted that the term "light-sending" means sending light, either directly from a light source or indirectly by reflecting light.

Thus, in embodiments where a light-sending layer comprises a reflective surface, light-sending by the light-sending layer comprises reflection at the reflective surface, i.e. the light-sending layer sends light by reflecting light at the reflective surface.

In embodiments where the light-sending layer comprises an illuminating surface, the light-sending layer sends light originating from the illuminating surface, i.e. from a light source illuminating the illuminating surface.

The fixed selection element 300 comprises further the first polarization layer 220a disposed in the front part 31 of the fixed selection device 3, the second polarization layer 220b disposed in contact with the light sending layer and the first polarization modifying layer 230a.

Naturally, the number of polarization modifying layer may be higher and depending on the wished appearance of the selection device 2.

The mobile selection element 400 comprises the second polarization modifying layer 230b.

In this embodiment, the polarization modifying layers 230a, 230b comprises each one half-wave plate. A half-wave plate delays a polarized light wave by 180°.

In this example, the set of marks 330 is formed by making openings in the first half-wave plate 230a (the one situated in the fixed selection element).

Naturally, in other examples, the set of marks 330 may be formed in the light-sending layer or in an opaque cap as described above for other embodiments, and as described in reference to FIGS. 3A and 3B, the position of the first and second polarization modifying layers may be different.

In this embodiment, the first polarization layer 220a polarizes light originating of the light-sending layer 210, this polarized light passes through one or two half-wave plates (depending on the situation of the mobile selection element 4), and respectively do not goes from or goes from the selecting device 200.

In FIG. 7B, the first mark $330_1$ is selected by positioning the mobile selection device 400 in superposition relative to the selected mark $330_1$. Light entering the selection device 200 through the first opening that corresponds to the selected mark $330_1$, passes through only one half-wave plate, the selected mark appearing obscured.

On the contrary, the selection device 200 appears illuminated around the selected mark $330_1$.

The non-selected marks $330_2$, $330_3$ appear illuminated and the zones of the selection device 200 around the non-selected marks appear obscured. It may be noted that the visual result is equivalent to the one according to the embodiment described in reference to FIG. 4.

The viewing of a selected mark is highly improved with this embodiment. In particular, the viewing of a selected mark is independent of the luminosity around the selection device.

According to an embodiment, the light-sending layer 210 is illuminated by light originating from a light-emitting diode.

For example, the light-sending layer comprises a flexible light-emitting diode such as an Organic Light-Emitting Diode.

Light sent by the light-sending layer may be of different colors that can be chosen according to aesthetical concerns.

According to another embodiment, the light-sending layer 210 is illuminated by light originating from an optical fiber.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A beverage preparation machine comprising a selection device, the selection device comprising:
a fixed selection element and a mobile selection element, the fixed selection element comprising a set of marks each corresponding to a beverage preparation parameter value, the mobile selection element being movable in relation to the set of marks for selecting a parameter value by positioning the mobile selection element in visual association with a selected mark,
the selection device further comprising a light-sending layer which is disposed in the fixed selection element, a polarization layer for polarizing the sent light, and at least one polarization modifying layer able to modify the polarization of the polarised light such that the visual aspect of a selected mark is modified when the mobile selection element is positioned in visual association with the selected mark, the at least one polarization modifying layer being disposed in superposition relative to the polarization layer and relative to the selected mark.

2. The beverage preparation machine according to claim 1, wherein the at least one polarization modifying layer able to modify the polarization of the polarised light comprises at least one wave-plate for shifting the phase between two perpendicular components of the polarised light, the visual aspect of the selected mark being modified or not as a function of the value of the phase shift.

3. The beverage preparation machine according to claim 1, wherein the fixed selection element comprises a layer in which the set of marks is formed by openings.

4. The beverage preparation machine according to claim 3, wherein the layer in which the set of marks is formed is an opaque cap, each mark being represented by at least one opening.

5. The beverage preparation machine according to claim 3, wherein the layer in which the set of marks is formed is the light-sending layer, the openings being filled and the rest of the layer being unfilled.

6. The beverage preparation machine according to claim 1, wherein the fixed selection element comprises a rear part and a front part, and the mobile selection element is configured to slide between the rear part and the front part, the light-sending layer being disposed in the rear part of the fixed selection element, the at least one polarization modifying layer being disposed in the fixed selection element and the polarization layer being disposed in the mobile selection element.

7. The beverage preparation machine according to claim 1, wherein the fixed selection element comprises a rear part and a front part, and the mobile selection element is configured to slide between the rear part and the front part, the light-sending layer being disposed in the rear part of the fixed selection element, the polarization layer being disposed in the front part of the fixed selection element, and the at least one polarization modifying layer being disposed in the mobile selection element.

8. The beverage preparation machine according to claim 1, comprising a second polarization modifying layer disposed in the fixed selection element and between the light-sending layer and the polarization layer.

9. The beverage preparation machine according to claim 3, wherein the layer in which the set of marks is formed is the at least one polarization modifying layer, the at least one polarization modifying layer being disposed in the fixed selection element in superposition relative to the polarization layer and relative to the light sending layer.

10. The beverage preparation machine according to claim 9, wherein each mark is represented by at least one of the openings in the at least polarization modifying layer.

11. The beverage preparation machine according to claim 9, comprising a second polarization modifying layer, the fixed selection element comprises a rear part and a front part, and the mobile selection element is configured to slide between the rear part and the front part, the light-sending layer being disposed in the rear part of the fixed selection element, the polarization layer being disposed in the front part of the fixed selection element, and the second polarization modifying layer being disposed in the mobile selection element.

12. The beverage preparation machine according to claim 1, wherein the light-sending layer comprises a reflective surface sending reflected light originating from the outside of the selection device, and the at least one polarization modifying layer comprises one quarter-wave plate.

13. The beverage preparation machine according to claim 1, wherein the light-sending layer comprises an illuminating surface, the selection device further comprising a second polarization layer disposed in contact with the light-sending layer, and the at least one polarization modifying layer comprises one half-wave plate.

14. The beverage preparation machine according to claim 13, wherein the light-sending layer is illuminated by light originating from a light-emitting diode.

* * * * *